(12) United States Patent
Fang et al.

(10) Patent No.: US 11,269,440 B1
(45) Date of Patent: Mar. 8, 2022

(54) FOLDABLE FORCE SENSING DEVICE

(71) Applicant: UNIVERSAL CEMENT CORPORATION, Taipei (TW)

(72) Inventors: Shao-Chuan Fang, Taitung County (TW); Chih-Sheng Hou, Taipei (TW)

(73) Assignee: UNIVERSAL CEMENT CORPORATION, Taipei (TW)

( * ) Notice: Subject to any disclaimer, the term of this patent is extended or adjusted under 35 U.S.C. 154(b) by 0 days.

(21) Appl. No.: 16/991,062

(22) Filed: Aug. 12, 2020

(51) Int. Cl.
| | |
|---|---|
| *G06K 9/00* | (2006.01) |
| *G06F 3/041* | (2006.01) |
| *G01L 1/18* | (2006.01) |
| *G01L 1/16* | (2006.01) |
| *G06F 1/16* | (2006.01) |
| *G06F 3/044* | (2006.01) |

(52) U.S. Cl.
CPC ............ *G06F 3/04144* (2019.05); *G01L 1/16* (2013.01); *G01L 1/18* (2013.01); *G06F 1/1652* (2013.01); *G06F 3/04166* (2019.05); *G06F 3/0448* (2019.05)

(58) Field of Classification Search
CPC .. G06F 3/03144; G06F 1/1652; G06F 3/0448; G06F 3/04166; G01L 1/16; G01L 1/18; A61B 5/0004
USPC ........................................................ 382/103
See application file for complete search history.

(56) References Cited

U.S. PATENT DOCUMENTS

2012/0087545 A1* 4/2012 Perlin ................. G06F 3/04166
382/103
2017/0146493 A1* 5/2017 Passmore ............. A61B 5/0004

FOREIGN PATENT DOCUMENTS

| CN | 107847164 A | 3/2018 |
| CN | 108534930 A | 9/2018 |
| CN | 108801516 A | 11/2018 |
| CN | 110333010 A | 10/2019 |
| TW | M547664 U | 8/2017 |
| WO | 2017/091151 A1 | 6/2017 |

* cited by examiner

*Primary Examiner* — Abdul-Samad A Adediran
(74) *Attorney, Agent, or Firm* — Winston Hsu

(57) ABSTRACT

A force sensing device includes a sensor array, a first substrate, a second substrate and a plurality of electrodes. The first substrate has a sensor region and a side region. The second substrate has a sensor region and a side region. The sensor array is formed above the sensor region of the first substrate. The plurality of electrodes are formed on the sensor region and the side region of the first substrate and below the sensor region and the side region of the second substrate, and coupled to the sensor array. The side region of the first substrate, the side region of the second substrate and the plurality of electrodes on the side region are foldable to a back side of the sensor array.

19 Claims, 8 Drawing Sheets

FOLDABLE FORCE SENSING DEVICE

BACKGROUND OF THE INVENTION

1. Field of the Invention

The disclosure relates to force sensing devices, and in particular, to a foldable force sensing device.

2. Description of the Prior Art

There has been a growing interest in providing frameless or seamless array devices in recent years. An array device such as a sensor array typically employs a considerable number of signal lines to control operations of pixels in the sensor array. Conventionally, these signal lines would take finite space at the side regions of the array device to connect between an operational array and a controller, resulting in a problem of designing a frameless or seamless structure of the array device.

SUMMARY OF THE INVENTION

According to one embodiment of the invention, a force sensing device includes a sensor array, a first substrate, a second substrate and a plurality of electrodes. The first substrate has a sensor region and a side region. The second substrate has a sensor region and a side region. The sensor array is formed above the sensor region of the first substrate. The plurality of electrodes are formed on the sensor region and the side region of the first substrate and below the sensor region and the side region of the second substrate, and coupled to the sensor array. The side region of the first substrate, the side region of the second substrate and the plurality of electrodes on the side region are foldable to a back side of the sensor array.

According to another embodiment of the invention, a tiled device includes a controller and a plurality of force sensing devices. The plurality of force sensing devices are tiled with each other. Each force sensing device includes a sensor array. The sensor array includes a matrix of pixels arranged at fixed vertical intervals and at fixed horizontal intervals. The controller is arranged at back sides of sensor arrays of the plurality of force sensing devices, and is coupled to the plurality of force sensing devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
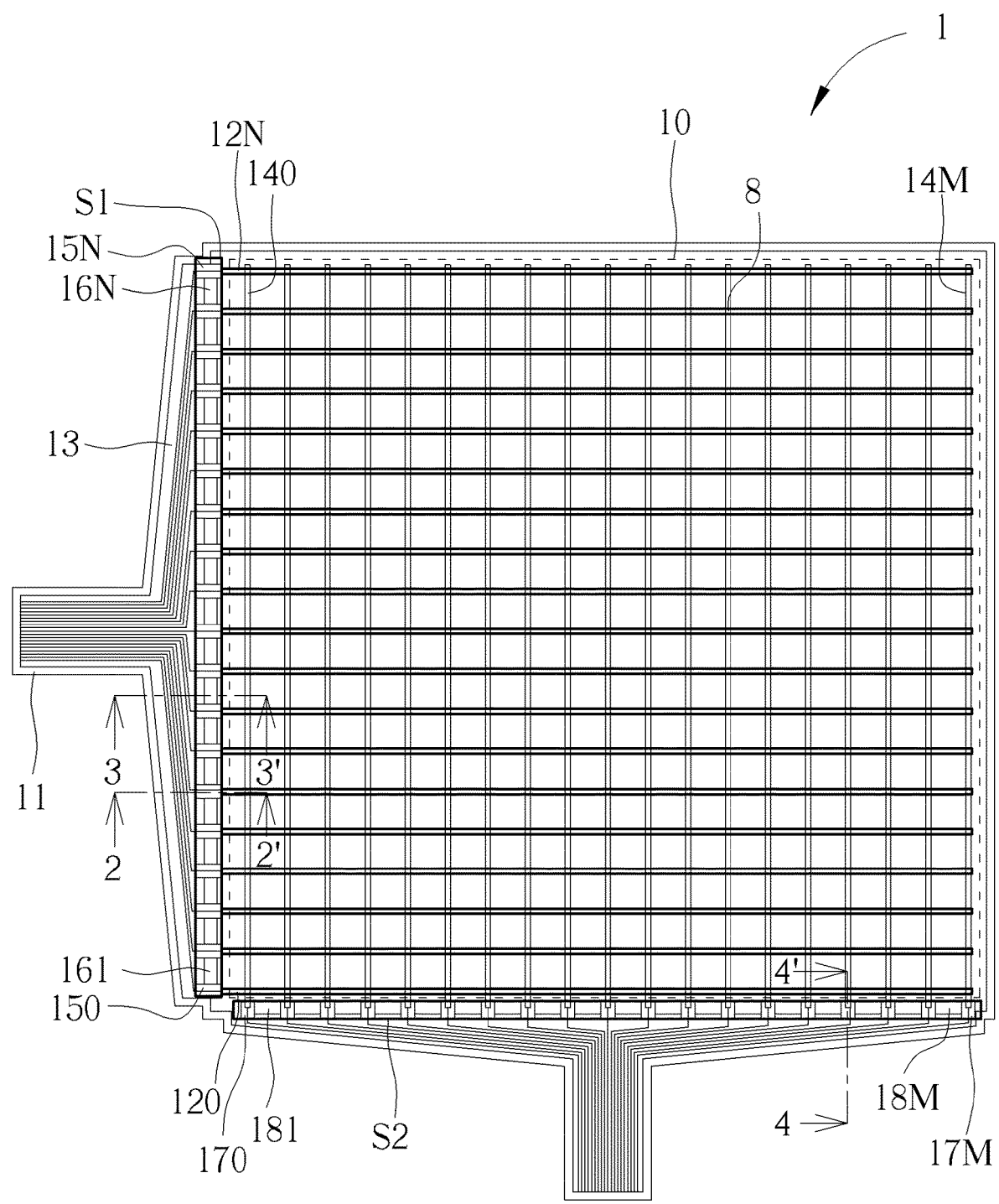
FIGS. 1A to 1C are schematic diagrams of a force sensing device in an unfolded position according to an embodiment of the invention.
Figure 1B:
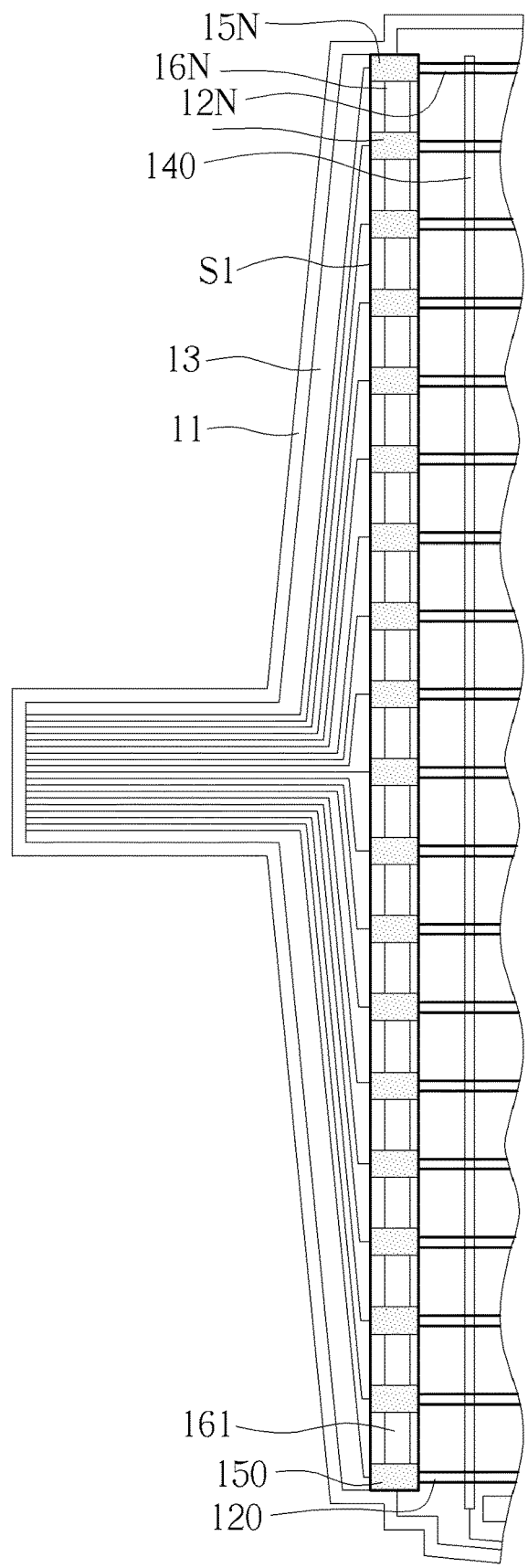
Figure 1C:
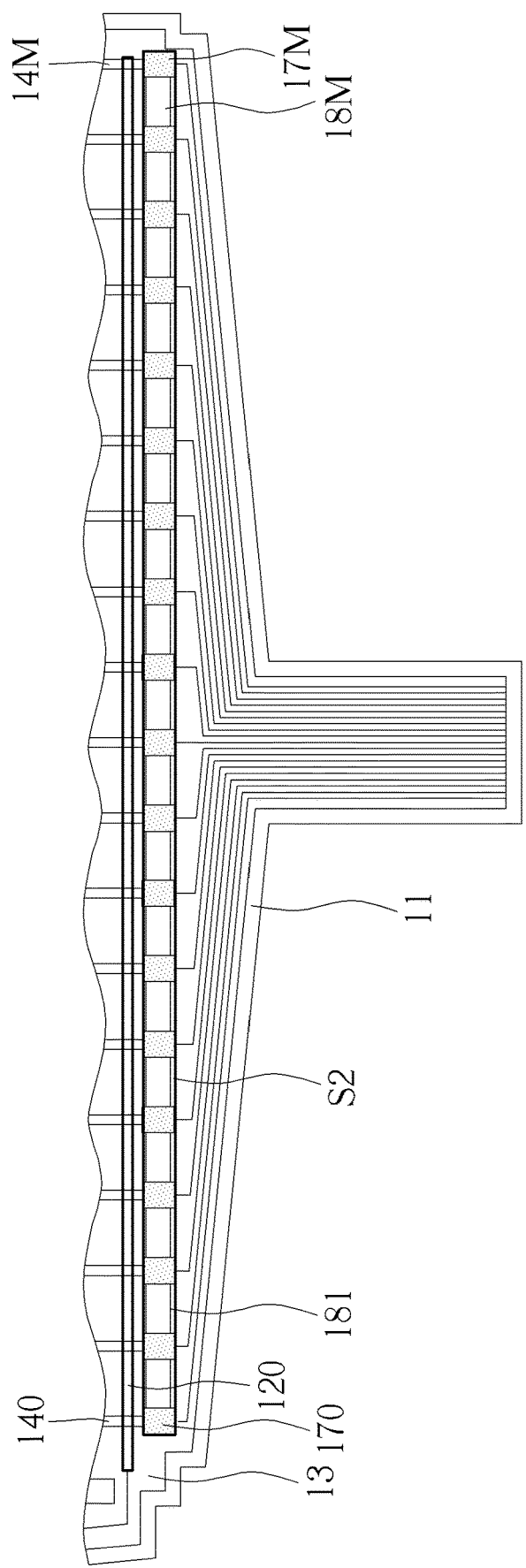

FIG. 1A is a schematic diagram of a force sensing device 1 in an unfolded position according to an embodiment of the invention. FIG. 1B is an enlarged view of a left side region of the force sensing device 1. FIG. 1C is an enlarged view of a bottom side region of the force sensing device 1. The force sensing device 1 may be arranged in a folded position or an unfolded position. During semiconductor fabrication, the force sensing device 1 may be formed in the unfolded position. Later, the force sensing device 1 may be folded in the folded position to form a seamless or frameless device. A plurality of the seamless devices may be tiled together along any edge of the seamless devices to form a larger tiled device.

Referring to FIG. 1A, the force sensing device 1 may be a pressure sensor, and may include a sensor array 10, a first substrate 11, a second substrate 13, a plurality of first electrodes 120 to 12N, a plurality of second electrodes 140 to 14M, and a plurality of first insulation layers 150 to 15N, a plurality of second insulation layers 170 to 17M and a controller, N, M being positive integers, and N, M being identical to or different from each other.

The first substrate 11 may have a sensor region and a side region, the sensor region being the area of the first substrate 11 above which the sensor array 10 is formed, and the side region being a side area of the first substrate 11 above which no sensor array 10 is formed. The first electrodes 120 to 12N may be formed on the sensor region and the side region of the first substrate 11. The side region of the first substrate and the first electrodes 120 to 12N on the side region are foldable to a back side of the sensor array 10, thereby forming a seamless structure when folded back. Similarly, the second substrate 13 may have a sensor region and a side region, the sensor region being the area of the second substrate 13 below which the sensor array 10 is formed, and the side region being a side area of the second substrate 13 below which no sensor array 10 is formed. The second electrodes 140 to 14M may be formed on the sensor region and the side region of the second substrate 13. The side region of the second substrate 13 and the second electrodes 140 to 14M on the side region may be foldable to the back side of the sensor array 10, thereby forming the seamless structure when folded back. The first electrodes 120 to 12N on the sensor region of the first substrate 11 and the second electrodes 140 to 14M on the sensor region of the second substrate 13 may be substantially perpendicular to each other.

The sensor array 10 may include an array of sensing pixels 8 arranged at fixed vertical intervals and at fixed horizontal intervals to maintain a fixed sensor pitch between the sensing pixels 8 along the vertical direction and the horizontal direction. Each sensing pixel 8 may be made of a force sensitive material. In one embodiment, N, M may both be 18, and the sensor array 10 may include an array of 19×19 sensing pixels 8.

The first substrate 11 and the second substrate 13 may be made of a rigid material, a flexible material or a combination thereof. The first substrate 11 may have a thickness less than 200 um, and the second substrate 13 may have a thickness less than 200 um. The first electrodes 120 to 12N and the second electrodes 140 to 14M may be made of a conductive material such as a metal or an alloy. The first substrate 11 may be a bottom substrate, and the second substrate 13 may be a top substrate arranged above the first substrate 11. The first electrodes 120 to 12N may be bottom electrodes, and the second electrodes 140 to 14M may be top electrodes.

Referring to FIG. 1B, on the left side region of the force sensing device 1, the first substrate 11 may have a plurality of openings 161 to 16N arranged in a column, the first electrodes 120 to 12N may be formed on the first substrate 11 and coupled to the sensor array 10 through gaps between the plurality of openings 161 to 16N, the second substrate 13 may have a slit S1 formed above the plurality of openings 161 to 16N and gaps between the plurality of openings 161 to 16N, respectively, and the plurality of first insulation layers 150 to 15N may be formed across the slit S1, between the first electrodes 120 to 12N and the second substrate 13 and between the plurality of openings 161 to 16N, respectively. In one example, a first insulation layer 15n may be formed across the slit S1, between the first electrode 12n and the second substrate 13, and between the openings 16n and 16(n+1), n being a positive integer between 1 and N−1. The plurality of first insulation layers 150 to 15N may prevent the first electrodes 120 to 12N from being exposed to the external environment and ensure the normal operations of the first electrodes 120 to 12N. The first electrodes 120 to 12N may be coupled to the sensor array 10 and the controller, and the controller may detect a force applied to the sensor array 10 according to signals delivered by the first electrodes 120 to 12N. The force sensing device 1 is foldable along the plurality of openings 161 to 16N and the slit S1. When being folded, the plurality of openings 161 to 16N and the slit S1 may effectively reduce a bending stress owing to the fold, resulting in a compact and seamless structure, enhancing flexibility of tiling a plurality of the force sensing devices 1, without affecting the sensor pitch and operations of sensing pixels 8 in the proximity to the fold and signal delivery of the first electrodes 120 to 12N.

Referring to FIG. 1C, on the bottom side region of the force sensing device 1, the second substrate 13 may have a plurality of openings 181 to 18M arranged in a row, the second electrodes 140 to 14M may be formed on the second substrate 13 and coupled to the sensor array 10 and the controller through gaps between the plurality of openings 181 to 18M, the first substrate 11 may have a slit S2 formed below the plurality of openings 181 to 18M and gaps between the plurality of openings 181 to 18M, respectively, and the plurality of second insulation layers 170 to 17M may be formed between the second electrodes 140 to 14M and the first substrate 11, across the slit S2, and between the plurality of openings 181 to 18M, respectively. In one example, a second insulation layer 17n may be formed across the slit S2, between the second electrode 14n and the first substrate 11, and between the openings 18m and 18(m+1), m being a positive integer between 1 and M−1. The plurality of second insulation layers 170 to 17M may prevent the second electrodes 140 to 14M from being exposed to the external environment and ensure the normal operations of the second electrodes 140 to 14M. The second electrodes 140 to 14M may be coupled to the sensor array 10 and the controller, and the controller may detect a force applied to the sensor array 10 according to signals delivered by the second electrodes 140 to 14M. The force sensing device 1 is foldable along the plurality of openings 181 to 18M and the slit S2. When being folded, the plurality of openings 181 to 18M and the slit S2 may effectively reduce a bending stress owing to the fold, resulting in a compact and seamless structure, enhancing flexibility of tiling a plurality of the force sensing devices 1, without affecting the sensor pitch and operations of sensing pixels 8 in the proximity to the fold and signal delivery of the second electrodes 140 to 14M.

While the plurality of openings 161 to 16N are formed between all the first electrodes 120 to 12N in the force sensing device 1, it would be appreciated that the plurality of openings may also be formed between some of the first electrodes 120 to 12N to meet specific design requirements. Likewise, while the plurality of openings 181 to 18M are formed between all the second electrodes 140 to 14M in the force sensing device 1, it would be appreciated that the plurality of openings may also be formed between some of the second electrodes 140 to 14M to meet specific design requirements.

Figure 2:
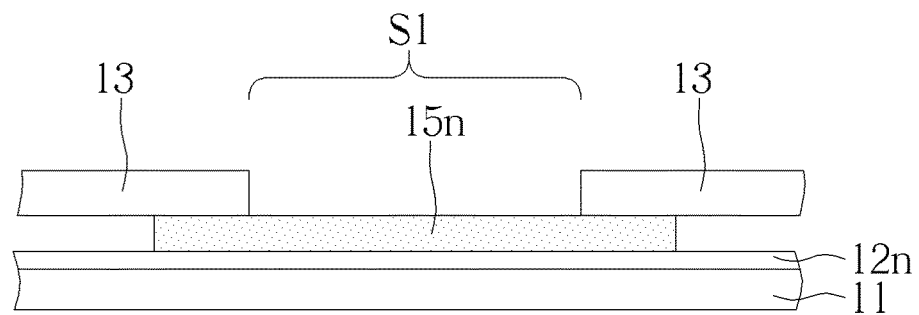
FIG. 2 is a cross-sectional view of the force sensing device in FIG. 1A along a line 2-2'.

FIG. 2 is a cross-sectional view of the force sensing device 1 along a line 2-2' in FIG. 1A. The cross-sectional view in FIG. 2 includes the first substrate 11, the first electrode 12n, the first insulation layer 15n, the second substrate 13 and the slit S1 in the unfolded position. The first substrate 11, the first electrode 12n, the first insulation layer 15n and the second substrate 13 are sequentially stacked on each other from the bottom to the top. The first electrode 12n is fabricated on a surface of the first substrate 11 to secure the connection between the sensor array 10 and the controller. The first insulation layer 15n is deposited on the first electrode 12n to prevent the first electrode 12n from being exposed to the external environment and ensure proper signal delivery of the first electrode 12n. The slit S1 is formed at the second substrate 13 to relieve the bending stress when being folded.

Figure 3:
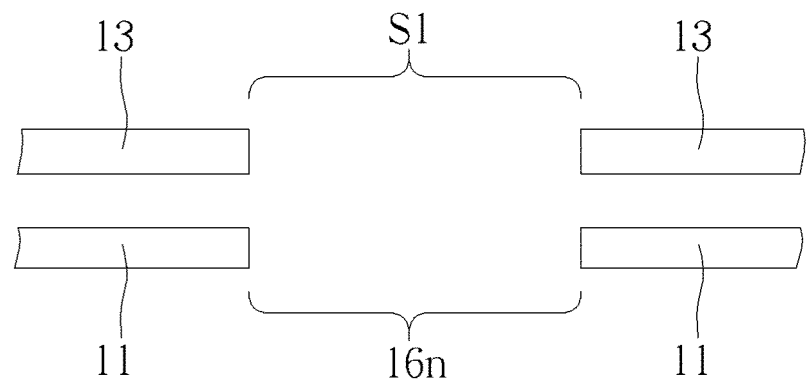
FIG. 3 is a cross-sectional view of the force sensing device in FIG. 1A along a line 3-3'.

FIG. 3 is a cross-sectional view of the force sensing device 1 along a line 3-3' in FIG. 1A. The cross-sectional view in FIG. 3 includes the first substrate 11, the opening 16n, the second substrate 13 and the slit S1 in the unfolded position. Since no electrode passes through the this part of the force sensing device 1, the opening 16n is formed at the first substrate 11, and the slit S1 is formed at the second substrate 13 to significantly relieve the bending stress. The cross-sectional view at an opening 18m at the bottom side region of the force sensing device 1 in FIG. 1C may be similar to FIG. 3, except that the opening 16n is replaced with the slit S2 and the slit S1 is replace with the opening 18n, the configuration reduces the bending stress considerably when the force sensing device 1 is folded along the plurality of openings 181 to 18M and the slit S2.

Figure 4:
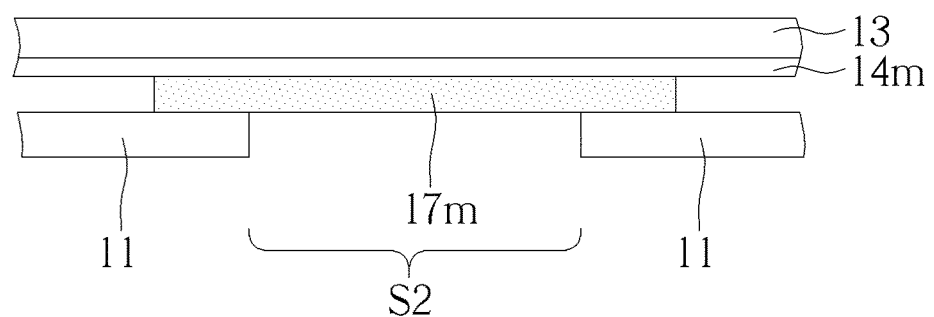
FIG. 4 is a cross sectional view of the force sensing device in FIG. 1A along a line 4-4'.

FIG. 4 is a cross sectional view of the force sensing device 1 along a line 4-4' in FIG. 1A. The cross-sectional view in FIG. 4 includes the first substrate 11, the slit S2, the second insulation layer 17m, the second electrode 14m and the second substrate 13 in the unfolded position. The first substrate 11, the second insulation layer 17m, the second electrode 14m and the second substrate 13 are sequentially stacked on each other from the bottom to the top. The slit S2 is formed at the first substrate 11 to relieve the bending stress when being folded. The second insulation layer 17m is deposited on the second electrode 14m to prevent the second electrode 14m from being exposed to the external environment and ensure proper signal delivery of the second electrode 14m. The second electrode 14m is fabricated on a surface of the second substrate 13 to secure the connection between the sensor array 10 and the controller.

Figure 5:
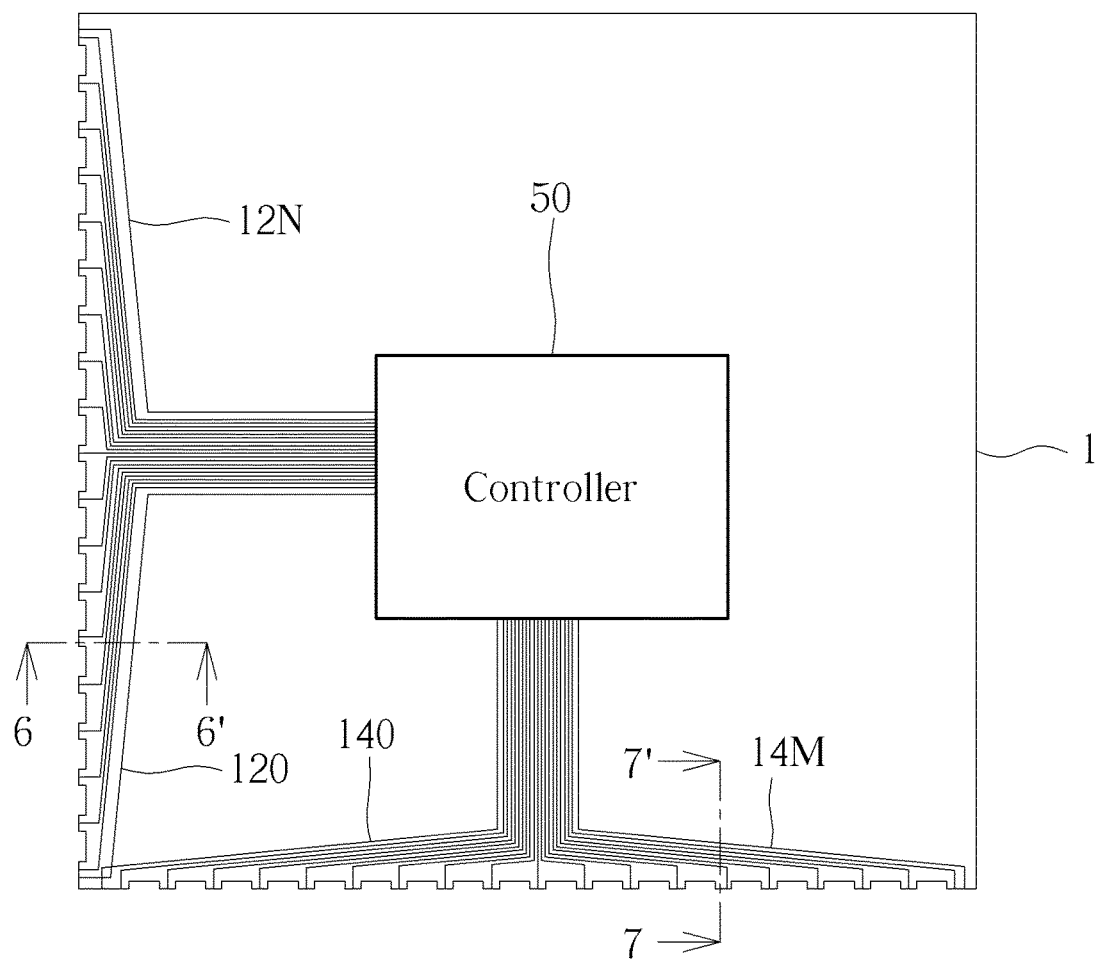
FIG. 5 is a schematic diagram of the force sensing device in FIG. 1A in a folded position.

FIG. 5 is a schematic diagram of the force sensing device 1 in a folded position, showing the first electrodes 120 to 12N, the second electrodes 140 to 14M and the controller 50. Accordingly, the first electrodes 120 to 12N may be folded back along the plurality of openings 161 to 16N and the slit S1 to the back of the force sensing device 1 and coupled to the controller 50. Likewise, the second electrodes 140 to 14M may be folded back along the plurality of openings 181 to 18M and the slit S2 to the back of the force sensing device 1 and coupled to the controller 50. The folding configuration ensures a compact and seamless structure, ensuring proper operations of sensing pixels 8 in the proximity to the fold and ensuring signal delivery of the first electrodes 120 to 12N and the second electrodes 140 to 14M, and enhancing flexibility of tiling a plurality of the force sensing devices 1.

Figure 6:
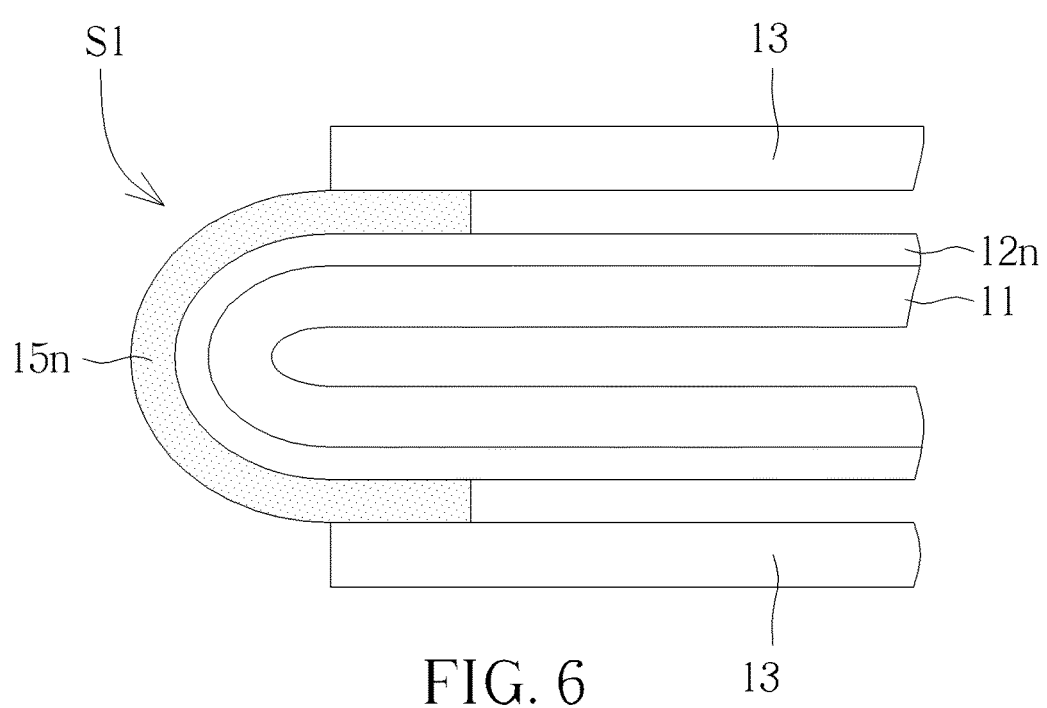
FIG. 6 is a cross-sectional view of the force sensing device in FIG. 5 along a line 6-6'.

FIG. 6 is a cross-sectional view of the force sensing device 1 along a line 6-6' in FIG. 5. The cross-sectional view in FIG. 6 includes the first substrate 11, the first electrode 12n, the first insulation layer 15n, the second substrate 13 and the slit S1 in the folded position. When the force sensing device 1 is folded along the plurality of openings 161 to 16N and the slit S1, the slit S1 may be used to relieve the bending stress of the second substrate 13 and the first insulation layer 15n may protect the first electrode 12n from being exposed.

Figure 7:
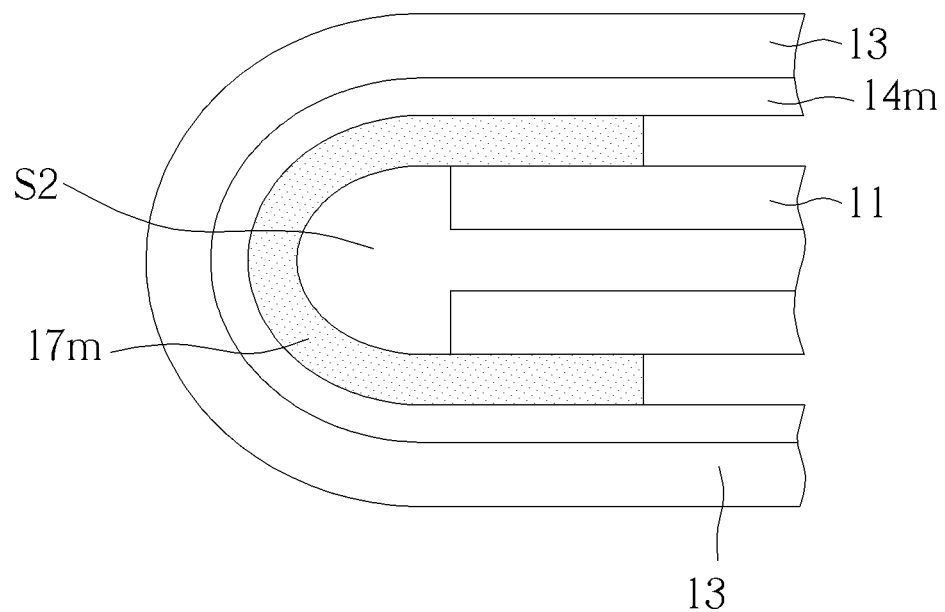
FIG. 7 is a cross-sectional view of the force sensing device in FIG. 5 along a line 7-7'.

FIG. 7 is a cross-sectional view of the force sensing device 1 along a line 7-7' in FIG. 5. The cross-sectional view in FIG. 7 includes the first substrate 11, the slit S2, the second insulation layer 17m, the second electrode 14m and the second substrate 13 in the folded position. When the force sensing device 1 is folded along the plurality of openings 181 to 18M and the slit S2, the slit S2 may be used to relieve the bending stress of the first substrate 11 and the first insulation layer 17m may protect the second electrode 14m from being exposed.

Figure 8:
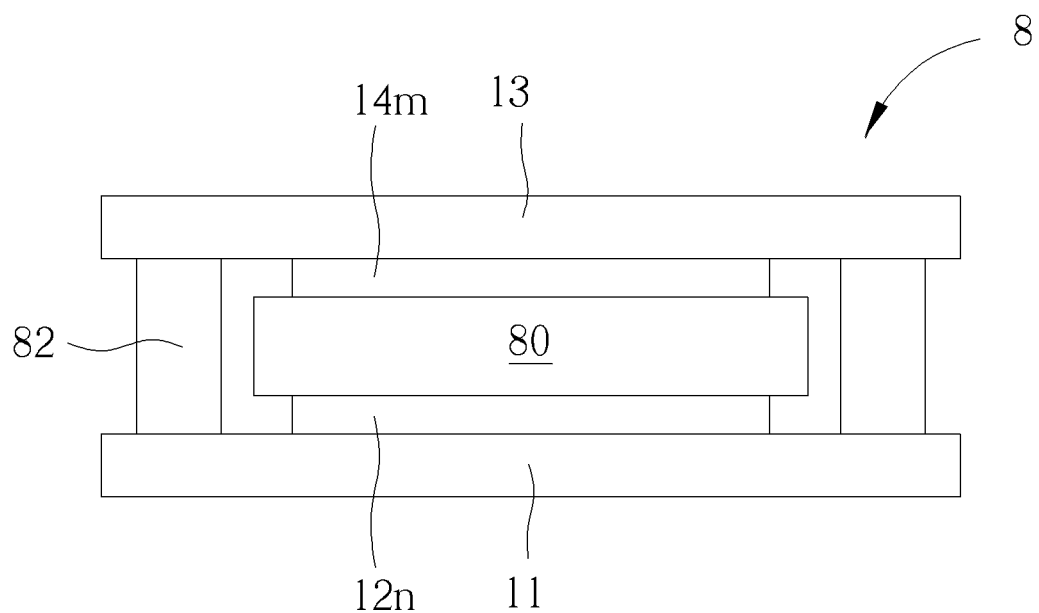
FIG. 8 is a cross-sectional view of a pixel of the sensor array in FIG. 1A.

FIG. 8 is a cross-sectional view of a sensing pixel 8 of the sensor array 10. The sensing pixel 8 includes the first substrate 11, the first electrode 12n, the force sensitive material 80, the second electrode 14m, the second substrate 13 and adhesion 82. The first substrate 11, the first electrode 12n, the force sensitive material 80, the second electrode 14m, the second substrate 13 are sequentially stacked on each other. The adhesion 82 may adhere between the first substrate 11 and the second substrate 13. The force sensitive material 80 may be made of a piezoelectric material, a piezoresistive material or a piezo-capacitive material.

Figure 9:
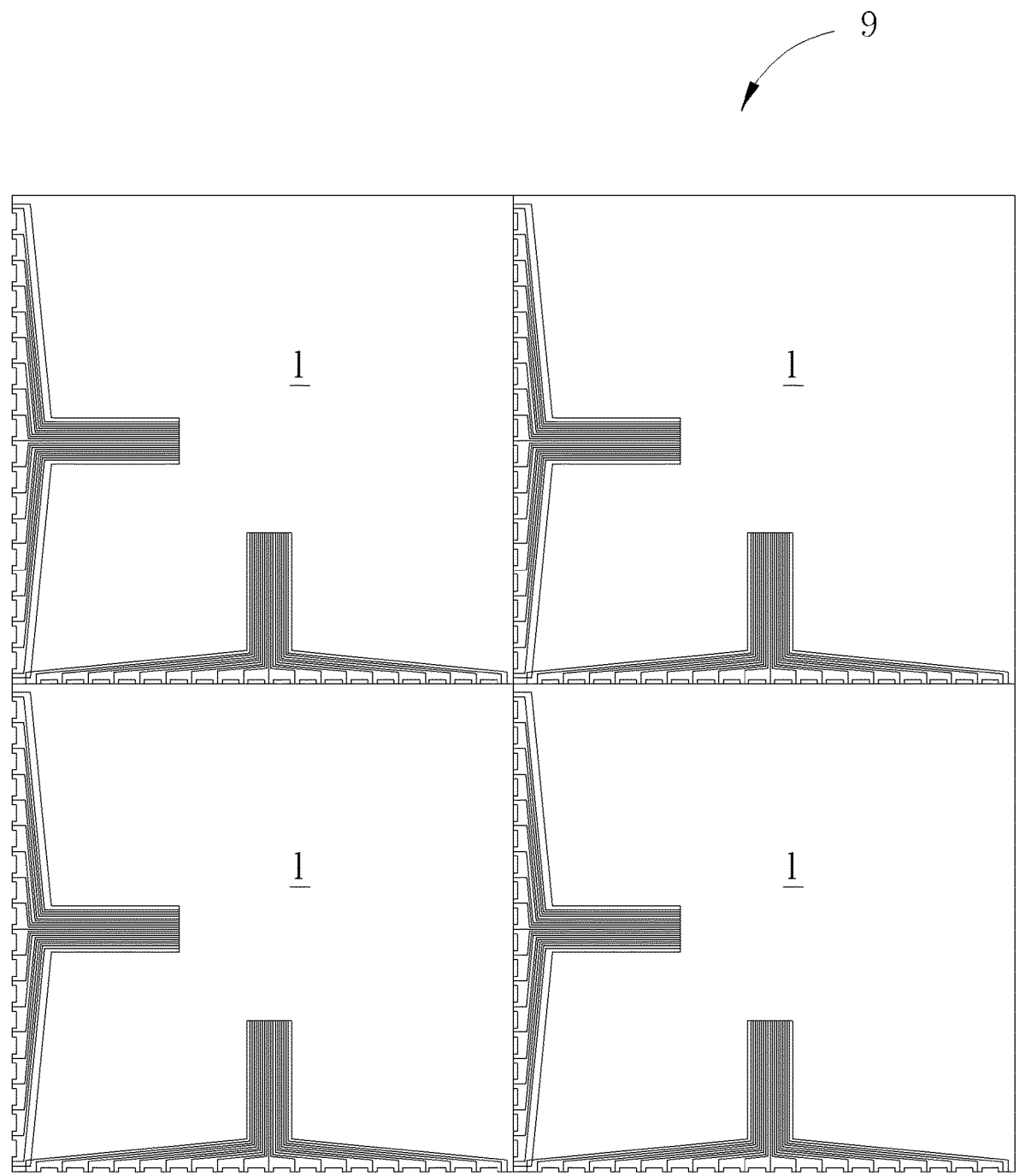
FIG. 9 is a schematic bottom view of a tiled device according to an embodiment of the invention.
Figure 10:
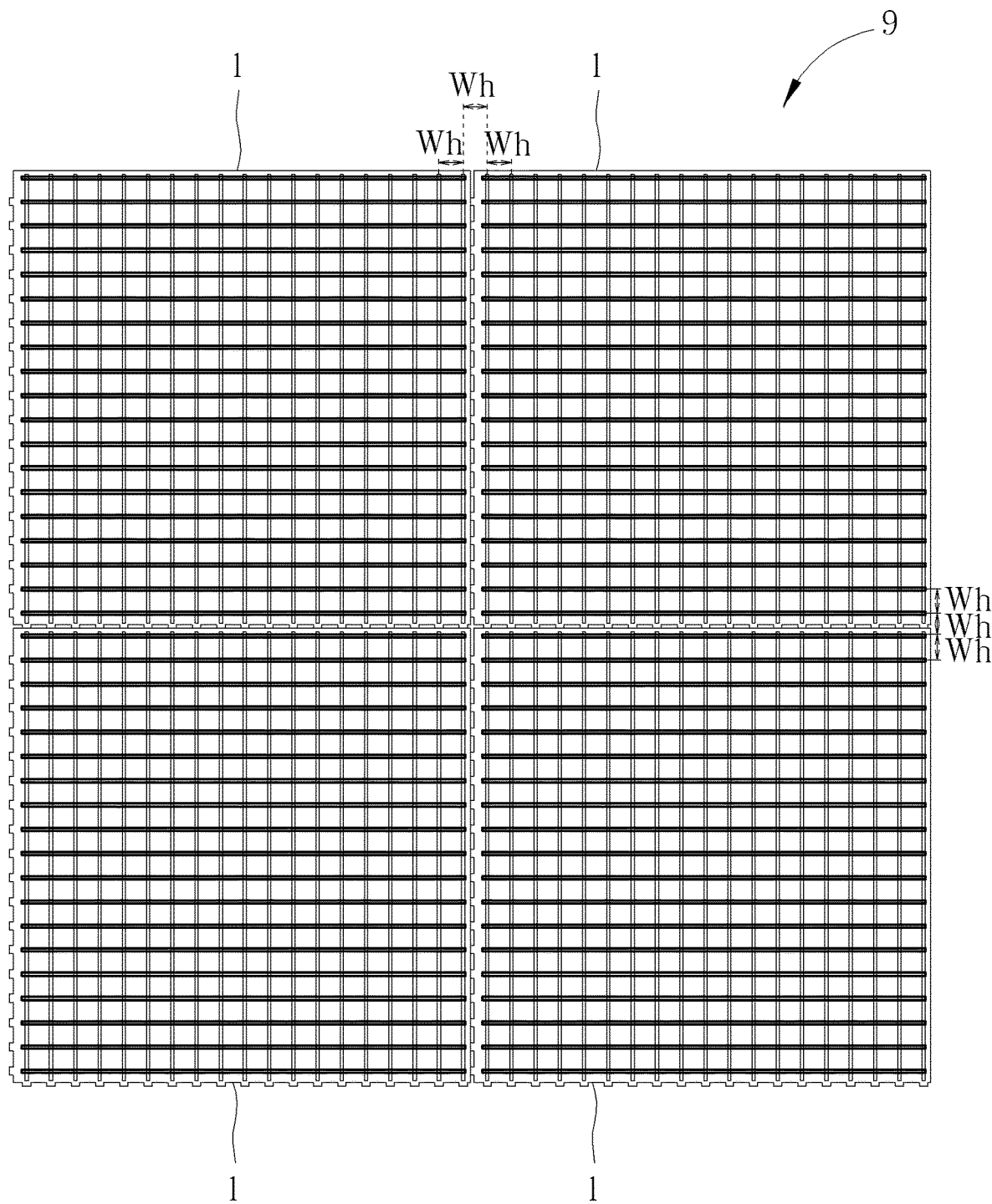
FIG. 10 is a schematic top view of the tiled device in FIG. 9.

FIG. 9 is a schematic bottom view of a tiled device 9 according to an embodiment of the invention, and FIG. 10 is a schematic top view of the tiled device 9. Four force sensing devices 1 are tiled together to form the tiled device 9. The first electrodes 120 to 12N and the second electrodes 140 to 14M of the four force sensing devices 1 may be coupled to the same controller or different controllers. Since the first electrodes 120 to 12N and the second electrodes 140 to 14M of each force sensing device 1 are folded back to provide the seamless structure, the size of the tiled device 9 is not limited to the routing areas of the first electrodes 120 to 12N and the second electrodes 140 to 14M, and may be expanded along any direction and to any desired size. The plurality of pixels in each force sensing device 1 are arranged into a matrix at fixed vertical intervals wv and at fixed horizontal intervals wh. Each of the force sensing devices 1 is folded back along the respective openings 161 to 16M and slit S2 and along the respective openings 181 to 18M and slit S2, adjacent pixels between vertically adjacent force sensing array devices 1 of the plurality of force sensing devices 1 are arranged at the fixed vertical intervals wv, and adjacent pixels between horizontally adjacent force sensing array devices 1 of the plurality of force sensing devices are arranged at the fixed horizontal intervals wh, resulting in a fixed pitch between adjacent pixels of the tiled device 9 along the vertical direction and the horizontal direction, regardless of the pixels being in the proximity to the edge or the center of the force sensing devices 1. Further, while 2×2 sensor tiles are employed in the embodiment, other shapes and sizes of the tiled device may also be implemented using the seamless structure of the force sensing device 1.

While the first electrodes 120 to 12N and the second electrodes 140 to 14M in FIGS. 1A to 1C, 5 and 8 are collected at the central part of the side regions, it would be appreciated that the first electrodes 120 to 12N and the second electrodes 140 to 14M may also be collected at one end of the side regions without interfering with each other when folded. For example, the first electrodes 120 to 12N may be collected at the top end of the left side region and the second electrodes 140 to 14M may be collected at the right end of the bottom side region. In this manner, the first electrodes 120 to 12N and the second electrodes 140 to 14M may not interfere with each other when folded, while delivering the desired seamless structure.

While the force sensing device 1 has been implemented as a sensor device, those skilled in the art would appreciate that by applying the similar principle the foldable structure of the force sensing device 1 may be adopted in other frameless devices or tiled devices, e.g., a frameless display device or a tiled display device.

The various embodiments of the force sensing device 1 in FIGS. 1A to 1C, 2 to 6 provide a compact and seamless device structure while ensuring proper operations of sensing pixels 8 in the proximity to the fold and ensuring proper signal delivery of the first electrodes 120 to 12N and the second electrodes 140 to 14M, and enhancing the flexibility of tiling a plurality of the force sensing devices 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A force sensing device comprising:
   a first substrate having a sensor region, a side region, and a plurality of openings;
   a sensor array formed above the sensor region of the first substrate;
   a plurality of first electrodes formed on the sensor region and the side region of the first substrate, and coupled to the sensor array through gaps between the plurality of openings of the first substrate;
   a second substrate having a sensor region and a side region, and having a slit formed above the plurality of openings of the first substrate and the gaps between the plurality of openings of the first substrate, the sensor region of the second substrate being above the sensor array; and
   a controller coupled to the first electrodes;
   wherein the side region of the first substrate and the plurality of first electrodes on the side region are foldable to a back side of the sensor array.

2. The force sensing device of claim 1, further comprising:
   a plurality of first insulation layers formed between the first electrodes and the second substrate, across the slit of the second substrate, and between the plurality of openings of the first substrate.

3. The force sensing device of claim 1, wherein the force sensing device is foldable along the plurality of openings of the first substrate and the slit of the second substrate.

4. The force sensing device of claim 1, wherein:
the second substrate further has a plurality of openings;
the first substrate further has a slit formed below the plurality of openings of the second substrate and gaps between the plurality of openings of the second substrate; and
the force sensing device further comprises:
a plurality of second electrodes formed on the sensor region and the side region of the second substrate, and coupled to the sensor array and the controller through the gaps between the plurality of openings of the second substrate; and
a plurality of second insulation layers formed between the second electrodes and the first substrate across the slit of the first substrate, and between the plurality of openings of the second substrate.

5. The force sensing device of claim 4, wherein the force sensing device is foldable along the plurality of openings of the second substrate and the slit of the first substrate.

6. The force sensing device of claim 4, wherein the plurality of first electrodes on the sensor region of the first substrate are substantially perpendicular to the plurality of second electrodes on the sensor region of the second substrate.

7. The force sensing device of claim 1, wherein the sensor array is made of a piezoelectric material.

8. The force sensing device of claim 1, wherein the sensor array is made of a piezoresistive material.

9. The force sensing device of claim 1, wherein the sensor array is made of a piezo-capacitive material.

10. The force sensing device of claim 1, wherein the sensor array comprises a plurality of pixels each comprising a force sensitive material formed between a corresponding first electrode and a corresponding second electrode.

11. The force sensing device of claim 10, wherein the plurality of pixels are arranged into a matrix at fixed vertical intervals and at fixed horizontal intervals.

12. The force sensing device of claim 1, wherein each of the pixels comprises adhesion configured to adhere between the first substrate and the second substrate.

13. A tiled device, comprising:
a plurality of force sensing devices tiled with each other, each force sensing device of the plurality of force sensing devices comprising:
a sensor array, the sensor array comprising a matrix of pixels arranged at fixed vertical intervals and at fixed horizontal intervals;
a first substrate having a plurality of openings;
a plurality of first electrodes arranged at a back side of the sensor array, formed on the first substrate and coupled to the sensor array through gaps between the plurality of openings of the first substrate; and
a second substrate having a slit formed above the plurality of openings of the first substrate and the gaps between the plurality of openings of the first substrate; and
a controller arranged at the back sides of the sensor arrays of the each force sensing devices, and coupled to the plurality of first electrodes of the each force sensing devices;
wherein adjacent pixels between vertically adjacent force sensing array devices of the plurality of force sensing devices are arranged at the fixed vertical intervals; and
adjacent pixels between horizontally adjacent force sensing array devices of the plurality of force sensing devices are arranged at the fixed horizontal intervals.

14. The tiled device of claim 13, wherein the plurality of first electrodes of the each force sensing devices are foldable to the back side of the sensor array of the each force sensing device.

15. The tiled device of claim 13, wherein the each force sensing devices further comprises:
a plurality of first insulation layers formed between the first electrodes and the second substrate, across the slit of the second substrate, and between the plurality of openings of the first substrate.

16. The tiled device of claim 13, wherein the each force sensing devices is foldable along the plurality of openings of the first substrate and the slit of the second substrate.

17. The tiled device of claim 13, wherein:
the second substrate further has a plurality of openings;
the first substrate further has a slit formed below the plurality of openings of the second substrate and gaps between the plurality of openings of the second substrate; and
the each force sensing devices further comprises:
a plurality of second electrodes formed on the second substrate and coupled to the sensor array of the each force sensing device and the controller through the gaps between the plurality of openings of the second substrate; and
a plurality of second insulation layers formed between the second electrodes and the first substrate across the slit of the first substrate, and between the plurality of openings of the second substrate.

18. The tiled device of claim 13, wherein the each force sensing devices is foldable along the plurality of openings of the second substrate and the slit of the first substrate.

19. The tiled device of claim 13, wherein the sensor array of the each force sensing device is made of a piezoelectric material, a piezoresistive material or a piezo-capacitive material.

* * * * *